(12) United States Patent
Goodmanson

(10) Patent No.: US 7,182,969 B2
(45) Date of Patent: *Feb. 27, 2007

(54) APPARATUS AND METHOD FOR CONTINUOUS REWORK FERMENTATION

(75) Inventor: David A Goodmanson, Phoenix, AZ (US)

(73) Assignee: Shaffer Manufacturing Corporation, Sidney, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/175,968

(22) Filed: Jul. 6, 2005

(65) Prior Publication Data

US 2006/0008566 A1    Jan. 12, 2006

Related U.S. Application Data

(60) Continuation of application No. 10/765,763, filed on Jan. 26, 2004, now abandoned, which is a division of application No. 09/815,472, filed on Mar. 23, 2001, now Pat. No. 6,743,457.

(51) Int. Cl.
*A21D 10/00* (2006.01)

(52) U.S. Cl. .......................... 426/549; 426/19; 426/20; 426/61; 426/62; 426/496; 426/504

(58) Field of Classification Search .................... None
See application file for complete search history.

(56) References Cited

U.S. PATENT DOCUMENTS

| | | | |
|---|---|---|---|
| 3,198,142 A | | 8/1965 | Lothes |
| 3,947,597 A | * | 3/1976 | Kieffaber .................... 426/27 |
| 4,046,920 A | | 9/1977 | Moline |
| 4,308,286 A | | 12/1981 | Anstett et al. |
| 4,500,548 A | | 2/1985 | Silva |
| 4,743,452 A | | 5/1988 | Felske et al. |
| 5,221,617 A | * | 6/1993 | Lynn .......................... 426/20 |
| 5,514,386 A | | 5/1996 | Domingues |
| 5,962,061 A | | 10/1999 | Ter Braak |
| 6,099,887 A | | 8/2000 | van Eendenburg et al. |
| 6,126,977 A | | 10/2000 | Bubar |

* cited by examiner

*Primary Examiner*—Lien Tran
(74) *Attorney, Agent, or Firm*—Harness, Dickey & Pierce, P.L.C.

(57) ABSTRACT

A method and system for the reclamation and re-use of rework dough created in the process of forming a final good. Initially, the reworks are formed into a batter into which a catalyst is placed. Subsequently the batter is cooled and stored until it is added to a new batch of dough. Through this method and system there may be a nearly total re-use of rework dough.

30 Claims, 3 Drawing Sheets

APPARATUS AND METHOD FOR CONTINUOUS REWORK FERMENTATION

CROSS-REFERENCE TO RELATED APPLICATION

This application is a continuation of U.S. patent application Ser. No. 10/765,763 now abandoned which is a divisional of U.S. patent application Ser. No. 09/815,472 filed on Mar. 23, 2001 now U.S. Pat. No. 6,743,457.

FIELD OF THE INVENTION

The present invention relates generally to the creation dough, and more particularly to the use of rework in such dough.

BACKGROUND

In the baking and pastry industry, several types of pastry dough may be used in the creation of such breads and pastries that are generally sold. Furthermore, processes are generally known in the art for creating such dough. One such dough and generally known process is that of making laminated dough in particular for use in croissants and pizza crust and other such pastries. Generally, a new mixture of flour, yeast and other necessary materials are mixed together to form a dough. The dough is typically fermented or aged for an extended period of time to produce the desired results and taste. This dough is then extruded, folded and laminated with particular fats to produce the desired finished product. The extended time of fermentation and the increased effort and labor of laminating the dough and adding the additional layers of fats produces an expensive dough material. However, in the creation of the final product, there is often extensive rework, also known as scrap, material that is produced that is unusable as a final product. Therefore, it is desirable to produce a method of reintroducing the rework into the original dough matrix to produce a final product.

Generally, rework may be added to an original or a new product batch. However, the rework generally has detrimental effects on a new product batch; therefore, rework may only be added in small amounts so as not to destroy an entire new batch. Generally, the limitations on the addition of rework is in the range of 10–15% to rework based on total batch weight or less to a new batch. Therefore, any remaining rework cannot be reused is merely disposed of or sold as scrap.

Conventionally, the reworks would only be allowed to be used at a ratio of 10–15% to a new batch of batter. This is generally due to the fact that when yeast is allowed to continue its processes in the batter 10, it dies and releases glutathione which destroys the protein of the gluten of the dough. When the gluten of the dough is destroyed, the dough may no longer be used to form products and generally becomes waste product that must be disposed. Therefore, in excess of 80% of the rework is merely disposed of since it cannot be reused. That rework becomes a waste of money and time in the production of the original dough and final product. Consequently, an increase of rework that may be used in a new batch is desirable so as to save the 80% rework that cannot be used to produce new batter and a final product.

Also, the reuse of rework that is generally known in the art leaves a great amount of discretion and possibility of error to the baker on the baking floor. This is due to the fact that the rework includes yeast which is continuing in its starvation cycle until it would destroy the gluten that is in the rework product. Therefore, the baker is left with the discretion and the choice of placing a certain amount of rework into a new dough process. This allows for great variation in final product that is produced from a process and batter that includes rework. Therefore, it is particularly desirable to include or create a process that allows for the reuse of a high percentage of rework without having the inconsistency that is created by the current use of rework.

SUMMARY OF THE INVENTION

The present invention provides a method and process for increasing the amount of rework that may be placed into a new batch of dough to an amount greatly exceeding the generally accepted 10–15% and reaching nearly total reuse of rework that may be reintroduced into a new batch of dough. Furthermore, the process of the present invention, may allow for a continuous reintroduction of reprocessed rework into a new batch of dough.

Generally, the rework will be reprocessed into a batter consistency having an initial specific gravity between 0.50 and 0.80 by the addition of warm water. To this reprocessing batter, a catalyst is added which quickens the dough to the stage in which it may be stored. Once the catalyst has taken its effect and the batter has been further processed and cooled, the reprocessed batter is then stored and later added to a new batch of dough. Once the batter has been fully reprocessed, it may then be added back to the original batter as a high reuse of the reworks from an original batch. This allows the original reworks to be reused in a more efficient manner so as to reduce overall cost. Furthermore, the reprocessed batter, after being added to a new batch of dough decreases the fermentation period of the new batch. This further reduces cost of producing the laminated dough by using this process.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
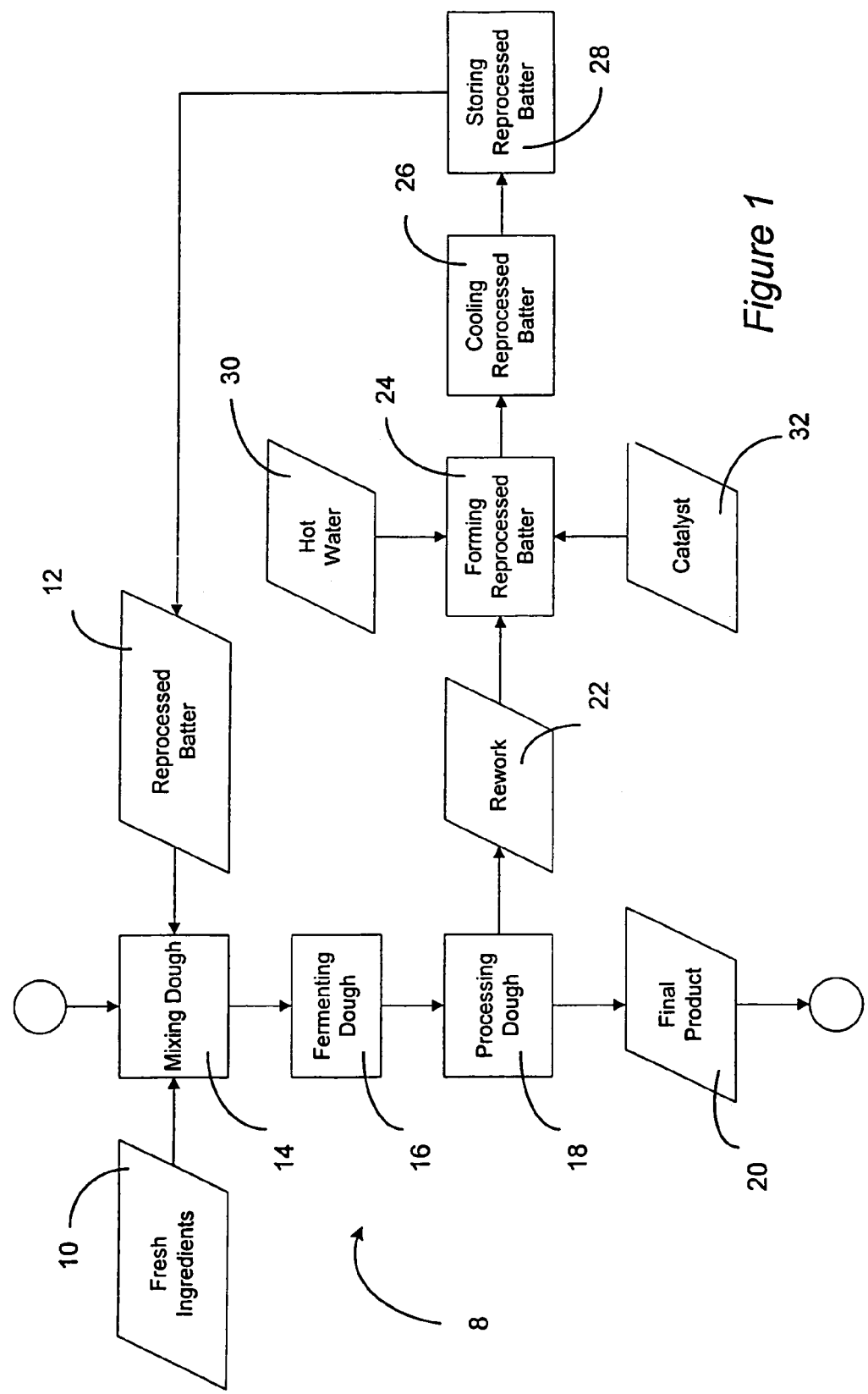
FIG. 1 is a flow chart showing the processing of the reworks in accordance with the present invention.

With reference to FIG. 1, the general process for continuous rework fermentation is illustrated in flow chart 8 and generally includes the addition of a catalyst and hot water to rework which is combined with fresh ingredients to form a dough. In particular, fresh ingredients 10 and reprocessed batter 12 are mixed together at block 14 in a commercial volume batch, large enough for use in industry or commercial bakery processes. In this case, fresh ingredients 10 include at least flour, sugar, yeast and possibly other chemical leavening agents for the production of dough, and in particular laminated dough. The mixing process 14 includes the dough ingredients being mixed and laminated with the other fats that are necessary to produce laminated dough. This is generally known in the art and summarily includes the working of the fresh ingredients and reprocessed batter 12 into a dough, which may include kneading, that is then laminated with fat products to produce a laminated dough. The dough must be fermented or proofed at block 16.

After fermentation 16, a particular pastry, pizza dough, or other item is formed in final processing at block 18 to produce a final product 20. The final product 20 may then be finished and sold. However, the final processing 18 also produces rework 22 as a by-product thereof. This rework 22 is then reprocessed through a series of steps 24–28 hereinafter described to form a reprocessed batter 12 which may be combined with fresh ingredients at mixing 14. It is to be understood that the laminated dough process is merely an exemplary dough process for purposes of illustration. One skilled in the art will recognize that the present invention has application to other product produced from other batters. Simply, the laminated dough is among the most expensive, therefore, the use of such a reprocessed batter would be the most advantageous thus it is used as the preferred example.

The rework 22 then begins a continuous rework fermentation wherein rework 22 is gathered together and placed in a suitable mixer to be reclaimed. After the rework 22 is gathered together, a measured amount of hot water 30 having a temperature between approximately 85 and 110 degrees Fahrenheit is added to the rework 22. Preferably, the hot water 30 has a temperature between 90 and 105 degrees and most preferably 105 degrees Fahrenheit. The mixture of rework 22 and hot water 30 is processed to create a reprocessing batter. The reprocessing batter has a viscosity which is generally the consistency of a pancake batter with an initial specific gravity between approximately 0.50 or 0.80, preferably between 0.60 and 0.70, and most batter, preferably approximately 0.70.

Next, a catalyst 32 is added to the reprocessing batter. The catalyst 32 of the present invention which includes table sugar or sucrose, dextrose, vital wheat gluten, a suitable enzyme and a suitable carrier. As presently preferred, L-cystine is used as a suitable enzyme and flour or soy is used as a suitable carrier. The formation of reprocessing batter, that is to say the mixing of the rework 22, hot water 30 and catalyst 32 should be completed in approximately 90 seconds and most preferably 60 seconds. Therefore, the addition of the hot water 30 to the rework 22 and the addition of the catalyst 32 to the subsequent reprocessing batter should occur rapidly such that the reprocessing batter is maintained at an elevated temperature of approximately 105° F.

For a better understanding of the present invention, the function of the catalyst 32 will be explained. The catalyst 32 speeds up the processes of the yeast remaining in rework 22. In this way, the yeast moves quickly to the end of its life cycle in producing the gas necessary to raise or proof the dough. If the yeast were simply left alone in the reprocessed batter without the catalyst 32, it would die, destroying the gluten and protein in the batter as discussed above. However, with the addition of the catalyst 32, the yeast in the reprocessing batter quickly proceeds through its process and does not die as it usually would if left in the original rework 20. Without an extensive review of biology of yeast, once the sugar in the rework 22 runs out the yeast dies of starvation without naturally expiring leaving sufficient amounts of enzymes and such to destroy the gluten and protein of the dough. However, with the addition of the catalyst, fermentation of the yeast is accelerated. Thus, when the yeast naturally expires, there are no enzymes left to destroy the proteins and the gluten of the batter. In this way, the reprocessed batter does not adversely effect the fresh ingredient to which it is added. Thus, the reprocessed batter 12 may be added as a nearly 100% usage with fresh ingredients 10 as opposed to conventional use of rework at approximately 10–15% usage.

With reference again to FIG. 1, as presently preferred, the cooling of the reprocessing batter with the catalyst 32 is under a controlled condition. As an initial summary, the temperature of the reprocessing batter is reduced at block 26 from the original temperature of the hot water 30 to a storage temperature of approximately 35 to 55 degrees Fahrenheit in a generally linear manner over approximately 30 minutes. Preferably, the reprocessing batter 12 is cooled to a temperature in the range of 40 to 50 degrees Fahrenheit. Therefore, the reprocessed batter 12 with the catalyst 32 is pumped to a heat exchanger to remove heat from the reprocessing batter 12 and allow for the gradual cooling over approximately 30 minutes. Once the controlled cooling 26 of the reprocessing batter is completed, the batter is stored at block 28 in a refrigerated container at approximately 40 to 50 degrees Fahrenheit where it is available to be mixed with fresh ingredients 10 at block 14.

The following example is an illustration of the manner in which the present invention is carried out. As long as the proportions remain relatively stable, smaller or larger batches of the reprocessing batter and fresh ingredients may be produced. A typical dough without the addition of the reprocessed batter would generally include approximately 100 pounds of flour, twelve pounds of sugar, one-half pound of salt, three pounds of yeast, and 50 pounds of water. In accordance with the present invention, a dough mixture for creating baked goods includes about 30% to 55% fresh ingredients and about 45% to about 70% reprocessed batter. The reprocessing batter is used in place of the water. Specifically, a dough may include 100 pounds of flour, twelve pounds of sugar, one-half pound of salt, 3 pounds of yeast, and 150 pounds of the reprocessed batter. Since the reprocessed batter is formulated using approximately 250 pounds of original rework, 150 pounds of water and approximately twenty pounds of catalyst, 150 pounds of reprocessed batter includes approximately 50 pounds of water.

In this specific example, the catalyst 32 includes approximately twelve pounds table sugar, four pounds dextrose, two pounds wheat gluten, four ounces of L-cystine and two pounds of flour for a total weight of approximately twenty pounds. More generally, the catalyst includes between 58–62% sugar, 18–22% dextrose, 8–12% wheat gluten, 0.75–1.5% of L-cytine, and 8–12% of flour by weight. Most preferably, the catalyst will include a 59–61% sugar, 19–21% dextrose, 9–11% gluten, 9–11% flour, and 0.75–1.50% L-cystine by weight. Thus, the reprocessed batter introduced into the new batter includes approximately 50 pounds of water and 100 pounds of other ingredients including the flour, the naturally-expired yeast, and the other sugar products from the catalyst 32 and the reworks 22.

The dough including the reprocessed batter may be used just as a dough made entirely from fresh ingredient would be used in the production of final products. Therefore, there is no need of additional products to use the reprocessing batter. Furthermore, no exceptional or new equipment, (other than that used during the continuous rework fermentation) would need to be used to produce the laminated dough beyond that which is used already, even with the use of a new batter including the reprocessing batter. The creation of reprocessing batter in this manner allows for a consistent reprocessing batter. Since fermentation of the yeast in the reprocessing batter has been accelerated through the use of the catalyst, there is nothing left in the reprocessing batter that may destroy any of the proteins or other constituents of the batter. Therefore, as long as the reprocessing batter is stored at the proper temperatures, it may be used at any time from immediately after its creation through an extended delay without any special discretion or knowledge of the baker producing new batter. Therefore, inconsistencies that may have been produced through the use of conventional methods of using rework are no longer present due to the catalyst and the reprocessing method disclosed herein.

An additional advantage of the present invention is that the fermentation period of a dough including the reprocessing batter may be significantly decreased. Conventionally, the inclusion of a long fermentation period at block 16 is needed. When using an all fresh ingredient batter, the fermentation period 16 is generally between 12 and 24 hours. Such an extensive fermentation period is necessary for the yeast to produce the gases to proof the dough and to create the desired fermented taste in the final products 20. However, with the use of the reprocessed batter 12 in combination with the fresh ingredients 10, a shortened fermentation period, on the order of 4–6 hours or less as required by a specific application, may be utilized. The fermentation period may be so decreased because the reprocessed batter which has been completely fermented imparts that taste to the new batter when it is added thereto. Therefore, an extended fermentation period is not needed, only a period long enough to proof the dough.

Figure 2:
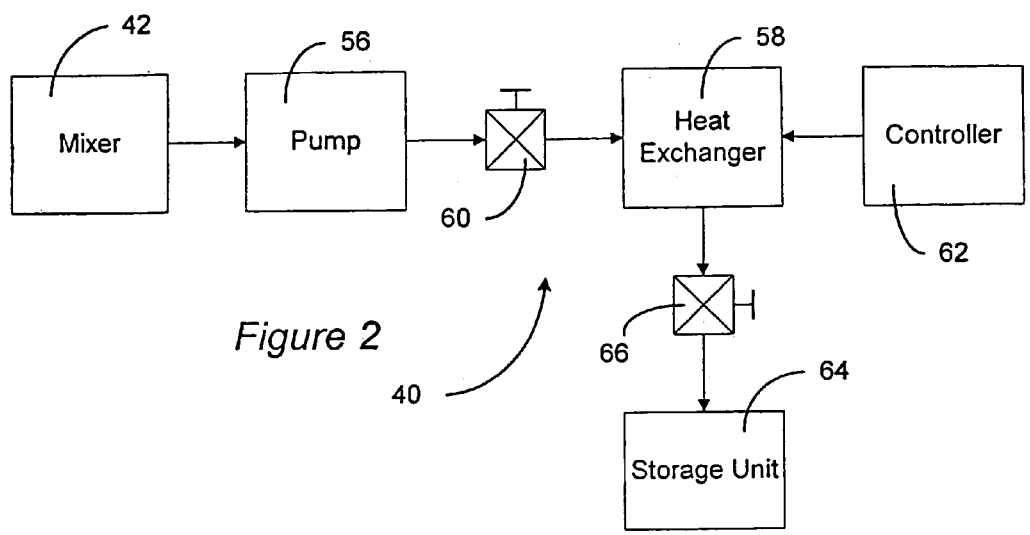
FIG. 2 is a schematic representation of the system required to carry out the rework processing in accordance with the present invention.

With reference to FIG. 2 the continuous rework fermentation system 40 for producing the reprocessed batter is illustrated. A mixer 42, suitable for production of commercial amounts of laminated dough, is necessary into which the reworks 22 may be placed. As previously discussed, the reprocessed batter, which has an initial specific gravity between 0.50 and 0.80, is produced by mixing hot water 30 along with the catalyst 32 and the reworks 22 in the mixer 42.

Figure 3:
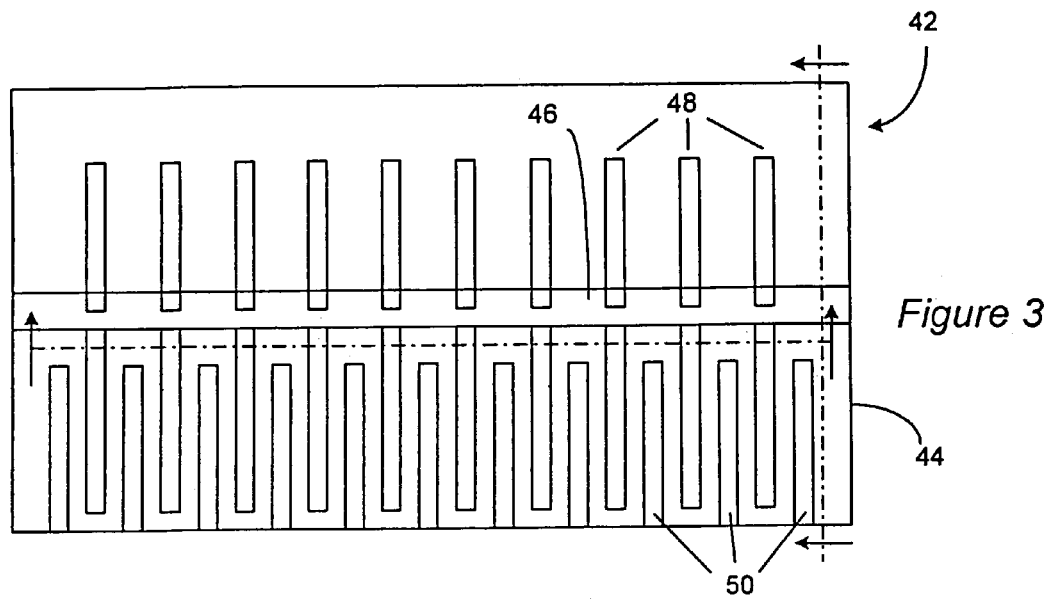
FIG. 3 is a cross-sectional view of a mixer used according to the present invention.
Figure 4:
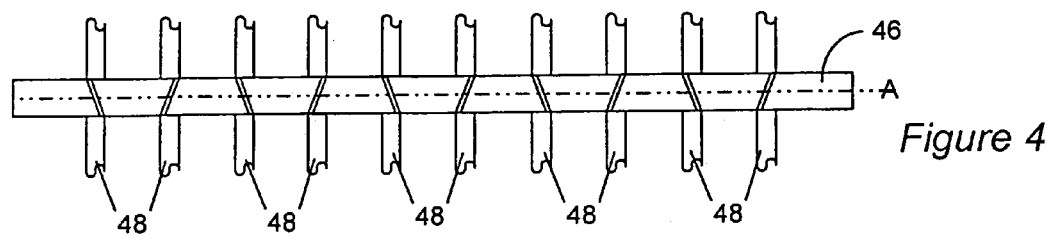
FIG. 4 is a plan view of an agitator of the mixer illustrated in FIG. 3.
Figure 5:
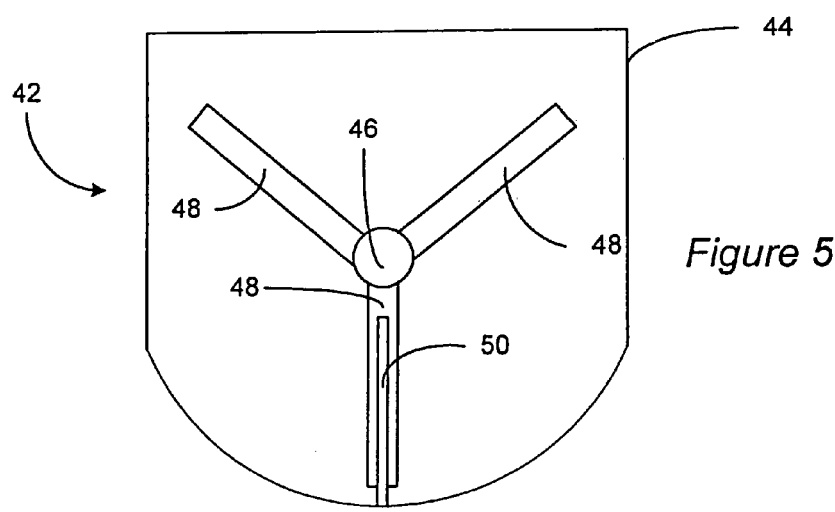
FIG. 5 is an end view of the mixer illustrated in FIG. 3.

With particular reference to FIGS. 3–5, a preferred mixer 42 for the disclosed reprocessing apparatus is shown. Particularly, mixer 42 includes a bowl 44, a shaft 46 with rotating tines 48, fixed tines 50 affixed to the bottom of the bowl 42. In this way, the shaft 46 having rotating tines 48 affixed thereto may spin about an axis A within the mixer 42 mixing the reprocessing batter that is placed therein. With particular reference to FIG. 5, it may be seen that the rotating tines 48 having an alternating orientation to form a series of "V" shape. For example, a first tine 52 is oriented from the upper left to lower right direction while a second tine 54 is oriented from the lower left to the upper right direction. This pattern is repeated along the length of the shaft 46. In this way, the orientation of the rotating mixing tines 48 allow for the ease of mixing the reprocessing batter. Furthermore, this orientation ensures the complete incorporation of the catalyst 32 and hot water 30 with the rework 22 that is placed in the mixer 42. Furthermore, the specific orientation of the rotating tines 48 allow for a kneading action of the reprocessing batter. Though not shown, the stationary tines 50 may also have a similar orientation to further assist in the kneading or the working of the reprocessing batter. Moreover, it is preferred that the mixing speed within the mixer 42 increase over the 60–90 second mixing period. In this way the rework 22 may be more efficiently mixed to incorporate the catalyst 32 and water 30 therein.

Figure 6:
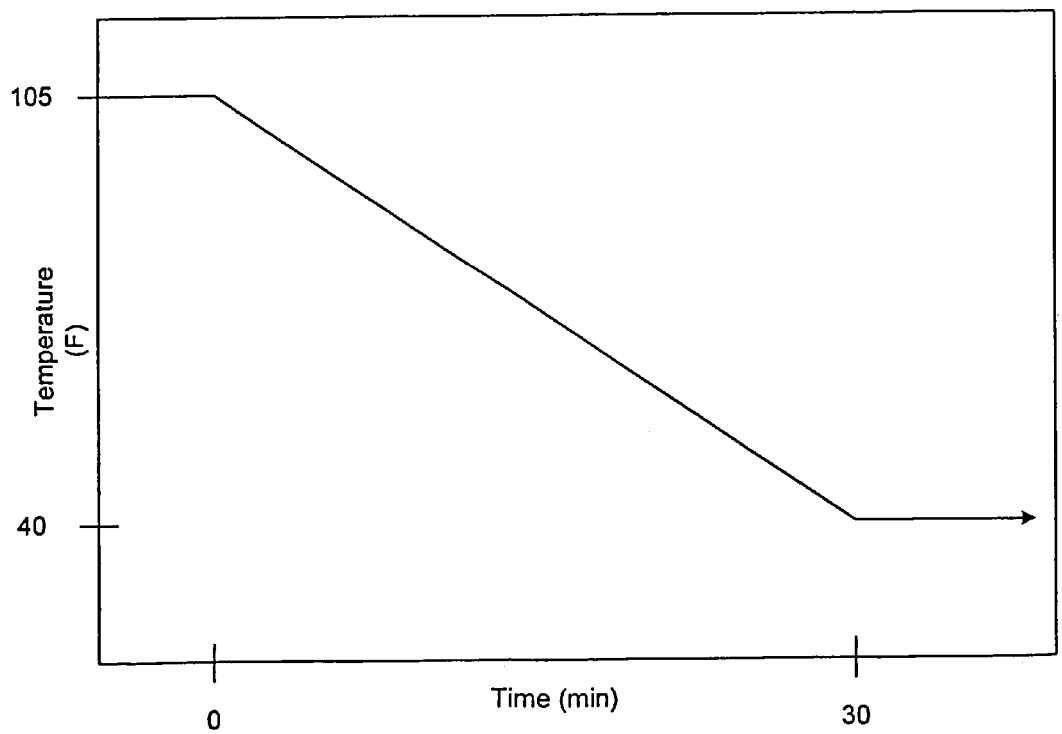
FIG. 6 is a chart showing the time-temperature profile for processing the reworks in accordance with the present invention.

With reference again to FIG. 2, once the reprocessing batter is processed to an acceptable specific gravity, a pump 56 pumps the reprocessed batter to a heat exchanger 58. A valve 60 is placed in line between pump 56 and heat exchanger 58 to control the flow of the reprocessing batter. The heat exchanger 58 is preferably a glycol-type device which removes the heat from the reprocessed batter in a continuous and controlled manner. The pump 56, heat exchanger 58 and valve 60 are controlled by a controller 62 to ensure that the heat transfer from the reprocessed batter is at the desired rate. With reference to FIG. 6, the heat removal from the reprocessed batter is preferably a generally linear reduction from the temperature of the hot water down to a temperature of approximately 40 to 50 degrees Fahrenheit in a time interval of approximately 30 minutes. The discharge of heat exchanger 58 is coupled to an acceptable storage unit 64. A valve 66 may be used between heat exchanger 58 and storage unit 64 to control the flow of the reprocessing batter. Once in the storage unit 64, the reprocessed batter is held at the approximately 40 degrees Fahrenheit for further use in the process.

When needed, the reprocessed batter is removed from the storage unit 64 and transported to a mixer to produce a new batter. The reprocessed batter need merely be pumped from the storage unit 64 since it still maintains a specific gravity between 0.80 and 0.90. As such, continuous rework fermentation system 40 is a self-contained module that may be readily incorporated into an existing facility. Due to the fact that the reprocessed batter is in a slurry, a pump 56 may be used to move the reprocessed batter from unit to unit as opposed to a manual movement in a trough or other container by human power or a conveyor system. As presently preferred, pump 56 is a positive displacement with stainless steel wheels. Such positive displacement pump minimizes any cavitation problems which might arise during pumping or the reprocessing batter.

In accordance with the present invention, the rework 22 may be reused at a very high rate in a new batter. This being the case, the cost of producing laminated dough may be significantly reduced by the saving of such reworks 22. Furthermore, the time needed to move from the mixing stage 14 to the final processing stage 18 is greatly reduced by the use of the reprocessed batter. The reduction of fermentation period of approximately 12–24 hours to a fermentation period of approximately 4–6 hours or less as required by a specific application also includes a dramatic decrease in production costs and an increase in production speed. Furthermore, the creation of a reprocessing batter withhas a specific gravity preferably no less than 0.40, and even after being stored preferably not greater than 1.0, allows the reprocessing batter to be pumped from unit to unit. This allows for the increased ability of fully automating the system of creating a reprocessing batter. This advantage also decreases the time and human labor required in the reuse of rework. Additionally, the consistency of the reprocessing batter is nearly the same from batch to batch using the presently disclosed method. Therefore, the discretion and possible mistakes or errors of the baker would be eliminated by the use of the presently disclosed catalyst and method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dough mixture for creating baked goods comprising about 30% to 55% fresh ingredients including flour, sugar, salt, and yeast and about 45% to 70% reprocessed batter including a catalyst, water, and a rework dough.

2. The dough mixture of claim 1, wherein said catalyst comprises about 58–62% of sugar, 18–22% of dextrose, 8–12% of wheat gluten, 0.75–1.50% of L-cystine, and 8–12% of flour by weight.

3. The dough mixture of claim 1 wherein said catalyst comprises active ingredients in a weight ratio of 16 pounds of sugar, 2 pounds of wheat gluten by weight and about 4 ounces of enzyme by weight.

4. The dough mixture of claim 3 wherein said sugar comprises about 75% sucrose by weight and about 25% dextrose by weight.

5. The dough mixture of claim 3 wherein said enzyme comprises L-cystine.

6. A dough mixture comprising:
a fresh dough having a fresh flour content and a fresh yeast content; and
a reprocessed batter including a rework dough having a rework flour content and a rework yeast content mixed with a catalyst and water in an amount such that substantially all of said rework yeast content is naturally expired;
wherein said reprocessed batter exceeds 15% by weight of a total weight of the dough.

7. The dough mixture of claim 6 wherein said percentage of said reprocessed batter is about 45% to about 70% of said total weight of the dough.

8. The dough mixture of claim 6 wherein said catalyst comprises active ingredients in a weight ratio of 16 pounds of sugar, 2 pounds of wheat gluten and about 4 ounces of enzyme.

9. The dough mixture of claim 8 wherein said sugar comprises about 75% sucrose by weight and about 25% dextrose by weight.

10. The dough mixture of claim 8 wherein said enzyme comprises L-cystine.

11. The dough mixture of claim 8 wherein said catalyst further comprises a carrier.

12. The dough mixture of claim 11 wherein said carrier is selected from the group consisting of flour and soy.

13. The dough mixture of claim 6 wherein said reprocessed batter further comprises about 58–62% of said rework dough, about 33–38% water, and about 3–6% of said catalyst.

14. A dough mixture comprising about 38 parts flour, about 33 parts rework dough, about 20 parts water, about 3 parts catalyst and about 1 part yeast, said catalyst includes about 87 parts sugar, about 11 parts wheat gluten and about 1 part enzyme, said sugar includes about 3 parts sucrose and about 1 part dextrose.

15. The dough mixture of claim 14 wherein said enzyme comprises L-cystine.

16. The dough mixture of claim 14 wherein said catalyst further comprises a carrier.

17. The dough mixture of claim 16 wherein said carrier is selected from the group consisting of flour and soy.

18. A reprocessed batter comprising about 58–62% of a rework dough including a rework flour content and a rework yeast content, about 33–38% water, and about 3–6% of a catalyst for naturally expiring substantially all of said rework yeast content.

19. The reprocessed batter of claim 18 further comprising about 60% of said rework dough, about 36% of said water, and about 4% of said catalyst.

20. The reprocessed batter of claim 18 wherein said catalyst comprises active ingredients in a weight ratio of 16 pounds of sugar, 2 pounds of wheat gluten and about 4 ounces of enzyme.

21. The reprocessed batter of claim 20 wherein said sugar comprises about 75% sucrose by weight and about 25% dextrose by weight.

22. The dough mixture of claim 20 wherein said enzyme comprises L-cystine.

23. The reprocessed batter of claim 20 wherein said catalyst further comprises a carrier.

24. The reprocessed batter of claim 23 wherein said carrier is selected from the group consisting of flour and soy.

25. A dough mixture comprising flour, sugar, yeast, and reprocessing batter including rework, water and catalyst in a weight ratio of about 100 pounds of said flour, about twelve pounds of said sugar, about three pounds of said yeast, about 90 pounds of said rework, about 53 pounds of said water and about seven pounds of said catalyst, wherein said catalyst includes active ingredients in a weight of about 87% sugar, about 11% of wheat gluten and about 1% of enzyme.

26. The dough mixture of claim 25 wherein said sugar comprises about 75% sucrose by weight and about 25% dextrose by weight.

27. The dough mixture of claim 25 wherein said enzyme comprises L-cystine.

28. The dough mixture of claim 25 wherein said catalyst further comprises a carrier.

29. The dough mixture of claim 28 wherein said carrier is selected from the group consisting of flour and soy.

30. The dough mixture of claim 25 wherein said water comprises about 36% of the reprocessing batter by weight.

* * * * *